United States Patent
Kagei et al.

(10) Patent No.: US 10,468,672 B2
(45) Date of Patent: Nov. 5, 2019

(54) POSITIVE ELECTRODE ACTIVE MATERIAL FOR LITHIUM SECONDARY BATTERY

(71) Applicant: Mitsui Mining & Smelting Co., Ltd., Tokyo (JP)

(72) Inventors: Shinya Kagei, Takehara (JP); Natsumi Shibamura, Takehara (JP); Yanko Marinov Todorov, Takehara (JP); Yoshimi Hata, Takehara (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 17 days.

(21) Appl. No.: 14/891,445

(22) PCT Filed: May 19, 2014

(86) PCT No.: PCT/JP2014/063191
§ 371 (c)(1),
(2) Date: Nov. 16, 2015

(87) PCT Pub. No.: WO2014/185548
PCT Pub. Date: Nov. 20, 2014

(65) Prior Publication Data
US 2016/0093882 A1 Mar. 31, 2016

(30) Foreign Application Priority Data
May 17, 2013 (JP) .................................. 2013-105515

(51) Int. Cl.

| | |
|---|---|
| *H01M 4/36* | (2006.01) |
| *H01M 4/505* | (2010.01) |
| *H01M 4/62* | (2006.01) |
| *H01M 10/052* | (2010.01) |
| *H01M 4/38* | (2006.01) |
| *H01M 4/587* | (2010.01) |
| *H01M 4/02* | (2006.01) |

(52) U.S. Cl.
CPC ............. *H01M 4/366* (2013.01); *H01M 4/38* (2013.01); *H01M 4/505* (2013.01); *H01M 4/587* (2013.01); *H01M 4/62* (2013.01); *H01M 10/052* (2013.01); *H01M 2004/028* (2013.01); *H01M 2220/20* (2013.01); *Y02T 10/7011* (2013.01)

(58) Field of Classification Search
CPC .................................................... H01M 4/366
See application file for complete search history.

(56) References Cited

U.S. PATENT DOCUMENTS

| | | |
|---|---|---|
| 2002/0127473 A1 | 9/2002 | Ooya et al. |
| 2004/0253518 A1 | 12/2004 | Hosoya et al. |
| 2012/0027929 A1 | 2/2012 | Huang et al. |
| 2012/0028113 A1 | 2/2012 | Huang et al. |
| 2012/0028114 A1 | 2/2012 | Huang et al. |
| 2012/0028115 A1 | 2/2012 | Huang et al. |
| 2012/0028118 A1 | 2/2012 | Huang et al. |
| 2012/0028119 A1 | 2/2012 | Huang et al. |
| 2012/0028120 A1 | 2/2012 | Huang et al. |
| 2013/0224608 A1 | 8/2013 | Sasaki et al. |
| 2013/0244113 A1 | 9/2013 | Li et al. |
| 2014/0010550 A1 | 1/2014 | Bahr et al. |

FOREIGN PATENT DOCUMENTS

| | | |
|---|---|---|
| EP | 0511632 A1 | 4/1992 |
| JP | 4329267 A | 11/1992 |
| JP | 11-073962 A | 3/1999 |
| JP | 2000-235857 A | 8/2000 |
| JP | 2000-264636 A | 9/2000 |
| JP | 2003-109599 A | 4/2003 |
| JP | 2003-197194 A | 7/2003 |
| JP | 2004-319129 A | 11/2004 |
| JP | 2006-036545 A | 2/2006 |
| JP | 2012-89473 A | 5/2012 |
| JP | 2012-116720 A | 6/2012 |
| WO | 2006/123572 A1 | 11/2006 |
| WO | 2012/081348 A1 | 6/2012 |
| WO | 2012/165020 A1 | 12/2012 |
| WO | 2013/024621 A1 | 2/2013 |
| WO | 2014/010730 A1 | 1/2014 |

*Primary Examiner* — Matthew J Merkling
(74) *Attorney, Agent, or Firm* — The Webb Law Firm

(57) ABSTRACT

Provided is a lithium secondary battery using a positive electrode active material which operates at a charging voltage in a region exceeding 4.3 V, and a novel positive electrode active material for a lithium secondary battery which can further enhance the output characteristics. Proposed is a positive electrode active material for a lithium secondary battery including positive electrode active material particles obtained by equipping the entire surface or a part of the surface of lithium manganese-containing composite oxide particles (also referred to as the "core particles") operating at a charging voltage in a region exceeding 4.3 V in a metal Li reference potential with a layer A containing at least Ti, Al, Zr, or two or more kinds of these, and C.

16 Claims, No Drawings

POSITIVE ELECTRODE ACTIVE MATERIAL FOR LITHIUM SECONDARY BATTERY

CROSS-REFERENCE TO RELATED APPLICATIONS

This application is the United States national phase of International Application No. PCT/JP2014/063191 filed May 19, 2014, and claims priority to Japanese Patent Application No. 2013-105515 filed May 17, 2013, the disclosures of which are hereby incorporated in their entirety by reference.

TECHNICAL FIELD

The present invention relates to a positive active material for a lithium secondary battery which can be suitably used as a positive electrode active material of a lithium secondary battery.

BACKGROUND ART

Lithium secondary batteries have characteristics that the energy density is high, its lifespan is long, and the like. Hence, lithium secondary batteries are widely used as a power source for home appliances such as a video camera, portable electronic devices such as a notebook computer and a mobile phone, and electric tools such as power tools, and they have also been recently applied to a large-sized battery that is mounted in an electric vehicle (EV) or a hybrid electric vehicle (HEV).

Lithium secondary batteries are a secondary battery having a structure in which lithium dissolves out from the positive electrode as an ion, moves to the negative electrode, and is absorbed therein at the time of charge and the lithium ion conversely returns from the negative electrode to the positive electrode at the time of discharge, and the high energy density thereof is known to be due to the potential of the positive electrode material.

As the positive electrode active material of the lithium secondary battery of this kind, a spinel-type lithium manganese-containing composite oxide having a manganese-based spinel structure (Fd-3m) such as $LiMn_2O_4$ and $LiNi_{0.5}Mn_{1.5}O_4$ is known in addition to a lithium transition metal oxide having a layer structure such as $LiCoO_2$, $LiNiO_2$, and $LiMnO_2$.

The spinel-type lithium manganese-containing composite oxide has attracted attention as the next generation positive electrode active material for a large-sized battery of an electric vehicle (EV), a hybrid electric vehicle (HEV), or the like since it is non-toxic and safe, has nature to be strong to overcharge, and the raw material price of which is inexpensive. In addition, the spinel-type lithium transition metal oxide (LMO) capable of three-dimensionally inserting and releasing a Li ion exhibits excellent output characteristics compared to a lithium transition metal oxide having a layer structure such as $LiCoO_2$, and thus it is expected to be used in an application requiring excellent output characteristics such as an EV battery and a HEV battery.

In recent years, it has been known to have an operating potential of about 5 V by substituting a part of the Mn sites in $LiMn_2O_4$ with other metals (Cr, Co, Ni, Fe, Cu, and the like), and at present, the development of manganese-based spinel-type lithium transition metal oxide having an operating potential of 4.5 V or more (5 V-class) is being actively carried out.

For example, a spinel-type lithium manganese composite oxide positive electrode active material having a high capacity obtained by adding chromium as the essential additive component and further adding nickel or cobalt to a spinel-type lithium manganese composite oxide is disclosed as a positive electrode active material of a lithium secondary battery having an electromotive force of a 5 V-class in Patent Document 1.

A crystal $LiMn_{2-y-z}Ni_yM_zO_4$ (where, M: at least one kind selected from the group consisting of Fe, Co, Ti, V, Mg, Zn, Ga, Nb, Mo, and Cu, $0.25 \leq y \leq 0.6$, and $0 \leq z \leq 0.1$) of a spinel structure which conducts charge and discharge at a potential of 4.5 V or more with respect to the Li metal is disclosed in Patent Document 2.

A spinel-type lithium manganese composite oxide represented by $Li_a(M_xMn_{2-x-y}A_y)O_4$ (in Formula, $0.4 < x$, $0 < y$, $x+y < 2$, and $0 < a < 1.2$. M includes one or more kinds of metal elements which are selected from the group consisting of Ni, Co, Fe, Cr, and Cu and at least include Ni. A includes at least one kind of metal element selected from Si or Ti; however, the value of the ratio y of A is $0.1 < y$ in a case in which A includes only Ti) is disclosed as a positive electrode material for lithium ion secondary battery having a high energy density so as to have a high voltage of 4.5 V or more with respect to Li in Patent Document 3.

A lithium nickel manganese composite oxide which has a spinel structure and is represented by Formula (I): $Li_{1+x}Ni_{0.5-1/4x-1/4y}Mn_{1.5-3/4x-3/4y}B_yO_4$ (where, in Formula (I), x and y are to be $0 \leq x \leq 0.025$ and $0 < y \leq 0.01$) and characterized in that a median diameter is from 5 to 20 μm, a coefficient of particle size variation is from 2.0 to 3.5%, and a BET specific surface area is from 0.30 to 1.30 m/g is disclosed as a positive electrode active material having a high capacity density as both of the tap density of the positive electrode active material and the initial discharge capacity of a secondary battery fabricated using the positive electrode active material are high in Patent Document 4.

CITATION LIST

Patent Document

Patent Document 1: JP 11-73962 A
Patent Document 2: JP 2000-235857 A
Patent Document 3: JP 2003-197194 A
Patent Document 4: JP 2012-116720 A

SUMMARY OF THE INVENTION

The invention relates to a lithium secondary battery using a positive electrode active material which operates at a charging voltage in a region exceeding 4.3 V, and it is intended to propose a novel positive electrode active material for a lithium secondary battery used in a lithium secondary battery so that the lithium secondary battery can exhibit further enhanced output characteristics than those of the prior art.

The invention proposes a positive electrode active material for a lithium secondary battery including positive electrode active material particles obtained by equipping the entire surface or a part of the surface of the lithium manganese-containing composite oxide particles (also referred to as the "core particles") operating at a charging voltage in a region exceeding 4.3 V in the metal Li reference potential with a layer (referred to as the "layer A") containing at least titanium (Ti), aluminum (Al), zirconium (Zr), or two or more kinds of these, and carbon (C).

In the positive electrode active material for a lithium secondary battery proposed by the invention, the entire surface or a part of the surface of the lithium manganese-containing composite oxide particles (core particles) is provided with the layer A containing at least titanium (Ti), aluminum (Al), zirconium (Zr), or two or more kinds of these, and carbon (C), and thus it is possible to further enhance the output characteristics of a lithium secondary battery of the prior art.

DETAILED DESCRIPTION OF THE INVENTION

Next, the invention will be described based on the embodiments for carrying out the invention. However, the invention is not limited to the embodiments to be described below.

<Present Positive Electrode Active Material>

The positive electrode active material for secondary battery according to an example of the present embodiment (hereinafter, referred to as the "present positive electrode active material") is a positive electrode active material for a lithium secondary battery which contains positive electrode active material particles (hereinafter, referred to as the "present positive electrode active material particles") obtained by equipping the entire surface or a part of the surface of lithium manganese-containing composite oxide particles (also referred to as the "core particles") with a layer (referred to as the "layer A") containing at least titanium (Ti), aluminum (Al), zirconium (Zr), or two or more kinds of these, and carbon (C).

The present positive electrode active material may contain other components as long as it contains the present positive electrode active material particles. However, it is preferable that the present positive electrode active material particles occupy 70% by mass or more of the present positive electrode active material, 90% by mass or more among them, and 95% by mass or more (including 100%) among them.

(Core Particles)

The core particles constituting the core portion of the present positive electrode active material particles may be a lithium manganese-containing composite oxide which operates at a charging voltage in a region exceeding 4.3 V in the metal Li reference potential.

Since the core particles may be a lithium manganese-containing composite oxide operating at a charging voltage in a region exceeding 4.3 V, for example, it may be a lithium manganese-containing composite oxide which operates at a charging voltage in a region exceeding 4.5 V and is used only in the region or it may be a lithium manganese-containing composite oxide which operates at a charging voltage of from 3 to 4.5 V and used in the region.

Hence, the core particles constituting the core portion of the present positive electrode active material particles may be a 4 V-class lithium manganese-containing composite oxide which has an operating potential of 3.5 V or more and less than 4.5 V, or it may be a 5 V-class lithium manganese-containing composite oxide which has an operating potential of 4.5 V or more.

The core particles constituting the core portion of the present positive electrode active material particles may be, for example, a spinel-type lithium manganese-containing composite oxide which has a crystal structure belonging to a space group Fd-3m, a lithium manganese-containing composite oxide which has a layer structure, a lithium manganese-containing composite oxide which has an olivine structure, or two or more kinds of these. The reason for this is that the effect obtained by providing the layer A is believed to be obtainable regardless of the composition of the core particles.

Among them, a 4 V-class spinel-type lithium manganese-containing composite oxide (also referred to as the "present 4 V-class spinel") which has an operating potential of 3.5 V or more and less than 4.5 V and a 5 V-class spinel-type lithium manganese-containing composite oxide (referred to as the "present 5 V-class spinel") which has an operating potential of 4.5 V or more are particularly preferable. Among them, the present 5 V-class spinel is particularly preferable.

Examples of the present 4 V-class spinel may include a powder (referred to as the "present 4 V-class spinel powder") which contains spinel-type lithium manganese-containing composite oxide particles (referred to as the "present 4 V-class spinel particles") including a crystal phase obtained by substituting a part of Mn sites in $LiMn_2O_{4-\delta}$ with a metal element as the main component.

Examples of the present 5 V-class spinel may include a powder (referred to as the "present 5 V-class spinel powder") which contains spinel-type lithium manganese-containing composite oxide particles (referred to as the "present 5 V-class spinel particles") including a crystal phase obtained by substituting a part of Mn sites in $LiMn_2O_{4-\delta}$ with Li, a metal element M1, and another metal element M2 as the main component.

The metal element M1 is a substitution element which mainly contributes to the exertion of an operating potential of 4.5 V or more at the metal Li reference potential, examples thereof may include Ni, Co, and Fe, and as M1, another metal element may be contained as long as at least one kind of these are contained.

The metal element M2 is a substitution element which mainly contributes to the stabilization of the crystal structure leading to the enhancement of properties, examples of the substituent element which contributes to an improvement in capacity retention rate may include Mg, Ti, Al, Ba, Cr, Fe, Co, and Nb. As M2, another metal element may be contained as long as at least one kind among these Mg, Ti, Al, Ba, Cr, Fe, Co, and Nb is contained.

As an example of the present 5 V-class spinel, a spinel-type lithium manganese-containing composite oxide represented by Formula (1): $Li[Li_aMn_{2-a-c}M1_bM2_c]O_{4-\delta}$ can be mentioned.

In Formula (1) above, "a" may be from 0.00 to 1.0 and it is even more preferable that "a" is 0.01 or more or 0.5 or less among them and 0.02 or more or 0.33 or less among them.

The "b" which indicates the content of M1 may be from 0.30 to 0.70, and it is even more preferable that "b" is 0.35 or more or 0.60 or less among them and 0.40 or more or 0.60 or less among them.

The "c" which indicates the content of M2 may be from 0.001 to 0.400, and it is even more preferable that "c" is 0.002 or more or 0.100 or less among them and 0.005 or more or 0.050 or less among them.

Incidentally, the "4-δ" in each Formula above indicates that it may have oxygen deficiency and a part of the oxygens may be substituted with fluorine.

However, the present 5 V-class spinel may contain other components as long as the functions of Li, Mn, M1, M2 and 0 are not completely inhibited. In particular, it may contain other elements as long as the content thereof is 0.5% by mass or less, respectively. This is because it is believed that the performance of the present spinel is not almost affected in the amount to this extent.

(Layer A)

The layer A may contain at least titanium (Ti), aluminum (Al), zirconium (Zr), or two or more kinds of these, and carbon (C).

The layer A may further contain phosphorus (P). Examples of the layer A containing phosphorus (P) may include the layer A containing Ti, C and P, the layer A containing Al, C and P, the layer A containing Zr, C and P, the layer A containing Ti, Al, C, and P, the layer A containing Ti, Zr, C, and P, the layer A containing Al, Zr, C, and P, and the layer A containing Ti, Al, Zr, C, and P.

Incidentally, the layer A may contain other elements other than Ti, Al, Zr, P, and C.

The content of carbon in the layer A is preferably from 0.1 to 0.5% by mass as the content of carbon in the present positive electrode active material. It is possible to expect, for example, an effect of serving a function like a conductive auxiliary agent as the layer A contains carbon in such a quantitative range.

From this point of view, the content of carbon in the layer A is preferably from 0.1 to 0.5% by mass as the content of carbon in the present positive electrode active material, and it is preferably 0.12% by mass or more or 0.48% by mass or less among them and 0.15% by mass or more or 0.45% by mass or less among them.

The layer A may be present so as to cover the entire surface of the core particle surface or it may be partially present on the core particle surface so that there may be the part where the layer A is not present.

In addition, another layer may be interposed between the core particle surface and the layer A. For example, a layer containing an oxide of titanium may be interposed.

In addition, another layer may be present on the surface side of the layer A.

Incidentally, the thickness of the layer A is preferably from 0.1 to 200 nm from the viewpoint of enhancing the output characteristics, and it is preferably 0.2 nm or more or 190 nm or less among them and 0.3 nm or more or 180 nm or less among them.

Such a layer A can be formed, for example, through a surface treatment of the core particles by conducting a surface treatment using a mixture prepared by mixing, for example, a coupling agent which contains titanium (Ti), aluminum (Al), zirconium (Zr), or two or more kinds of these with an organic solvent.

Specifically, an organic solvent and, for example, a coupling agent which contains titanium (Ti), aluminum (Al), zirconium (Zr), or two or more kinds of these may be added to the core particles and stirred. Thereafter, the resultant is dried in order to remove the organic solvent and then heated, for example, at a temperature higher than the boiling point of the organic solvent and less than 300° C. in order to fix the layer A if necessary, whereby the layer A containing titanium (Ti), aluminum (Al), zirconium (Zr), or two or more kinds of these, and carbon (C) can be formed.

(D50)

In the present positive electrode active material, D50 according to a volume-based particle size distribution obtained by measuring by a laser diffraction and scattering particle size distribution measuring method is preferably from 3 to 40 μm, it is preferably 4 μm or more among them and 5 μm or more among them, and it is even more preferably 10 μm or more or 40 μm or less among them and 13 μm or more or 30 μm or less among them.

It is advantageous that D50 of the present positive electrode active material is from 3 to 40 μm and particularly from 5 to 40 μm from the viewpoint of the electrode fabrication.

In this manner, in order to adjust D50 of the present positive electrode active material to be in the above range, the calcining condition (temperature, time, atmosphere, and the like) or the strength of crushing (rotation number of crusher and the like) after calcination in the production of the core particles may be adjusted. However, it is not limited to these methods.

(D10)

In the present positive electrode active material, D10 according to a volume-based particle size distribution obtained by measuring by a laser diffraction and scattering particle size distribution measuring method is preferably from 1 to 20 μm, it is particularly preferably 2 μm or more among them, 3 μm or more or 18 μm or less among them, and 4 μm or more or 16 μm or less among them.

It is preferable that D10 of the present positive electrode active material is 1 μm or more and particularly 2 μm or more from the viewpoint that the slurry dispersibility at the time of coating the electrode is more favorable and it is preferable that D10 is 16 μm or less from the viewpoint that it is possible to suppress a significant decrease in viscosity of the slurry at the time of coating the electrode.

In this manner, in order to adjust D10 of the present positive electrode active material to be in the above range, the calcining condition (temperature, time, atmosphere, and the like) or the strength of crushing (rotation number of crusher and the like) after calcination in the production of the core particles may be adjusted. However, it is not limited to these methods.

(Dmin)

In the present positive electrode active material, Dmin according to a volume-based particle size distribution obtained by measuring by a laser diffraction and scattering particle size distribution measuring method is preferably 10 μm or less, it is even more preferably 0.1 μm or more among them, 0.3 μm or more among them, and particularly preferably 0.5 μm or more or 8 μm or less among them.

The fact that Dmin of the present positive electrode active material is 10 μm or less means that the present positive electrode active material contains at least the present spinel particles having a particle size of 10 μm and it is distinguished from those obtained by removing all the fine particles by classification.

In this manner, in order to adjust Dmin of the present positive electrode active material to be in the above range, the fine particle attached to the surface of the present positive electrode active material particles may be removed using a difference in sedimentation velocity as to be described later. However, it is not limited to these methods.

(Specific Surface Area)

The specific surface area (BET) of the present positive electrode active material is preferably from 0.01 to 3.00 $m^2/g$, it is preferably 0.10 $m^2/g$ or more or 2.00 $m^2/g$ or less among them, it is preferably 1.50 $m^2/g$ or less among them, it is particularly preferably 1.00 $m^2/g$ or less among them, and it is even more preferably 0.80 $m^2/g$ or less among them.

In this manner, in order to adjust the specific surface area of the present positive electrode active material to be in the above range, for example, the temperature for the main calcination may be adjusted or the present positive electrode active material may be classified. However, it is not limited to these methods.

<Method for Producing Present Positive Electrode Active Material>

As a preferred example of the method for producing the present positive electrode active material, for example, it can be produced by a production method which includes a step of producing, for example, lithium manganese-containing composite oxide particles (core particles), then treating the lithium manganese-containing composite oxide particles with, for example, a coupling agent which contains titanium (Ti), aluminum (Al), zirconium (Zr), or two or more kinds of these, and subsequently reacting the coupling agent and the lithium manganese-containing composite oxide particles.

At this time, as the method for producing lithium manganese-containing composite oxide particles (core particles), a known method may be appropriately employed.

Here, the method for fabricating a powder (referred to as the "present spinel powder") of the spinel-type lithium manganese-containing composite oxide having a crystal structure belonging to the space group Fd-3m will be described.

(Method for Producing Present Spinel Powder)

The present spinel powder can be obtained by mixing raw materials such as a lithium compound, a manganese compound, an M1 metal compound, and an M2 metal compound, pulverizing using a wet pulverizer or the like, granulating and drying using a heat spray dryer or the like, calcination, conducting a heat treatment if necessary, and classifying if necessary. However, the method for producing the present spinel powder is not limited to the production method. In particular, the production method before introducing the spinel-type lithium manganese-containing composite oxide into water and stirring it is arbitrary. For example, a granulated powder to be subjected to calcination may be fabricated by the so-called co-precipitation method, and the separating means after calcination may be changed to another method.

Examples of the lithium compound may include lithium hydroxide (LiOH), lithium carbonate ($Li_2CO_3$), lithium nitrate ($LiNO_3$), $LiOH \cdot H_2O$, lithium oxide ($Li_2O$), another fatty acid lithium, or a lithium halide. Among them, a hydroxide salt, a carbonate salt, and a nitrate salt of lithium are preferable.

The manganese compound is not particularly limited. For example, manganese carbonate, manganese nitrate, manganese chloride, manganese dioxide, manganese trioxide, and trimanganese tetraoxide can be used, and manganese carbonate and manganese dioxide are preferable among them. Among them, electrolytic manganese dioxide obtained by electrolysis is particularly preferable.

As the M1 metal compound and the M2 metal compound, a carbonate salt, a nitrate salt, a chloride salt, an oxyhydroxide salt, a hydroxide and the like of the M1 or M2 metal can be used.

Incidentally, a boron compound may be blended into the raw material. The boron compound may be a compound containing boron (element B), and for example, it is preferable to use boric acid or a lithium borate. As lithium borate, it is possible to use various forms of lithium borate such as lithium metaborate ($LiBO_2$), lithium tetraborate ($Li_2B_4O_7$), lithium pentaborate ($LiB_5O_8$), and lithium perborate ($Li_2B_2O_5$).

A composite oxide phase containing Ni, Mn, and B, for example the crystal phase $Ni_5MnO_4(BO_3)_2$ is formed in addition to the crystal phase of the present spinel when such a boron compound is compounded.

As the method for mixing the raw materials, it is preferable to add a liquid medium such as water or a dispersant to the raw materials and to form a slurry by wet mixing them together, and it is preferable to pulverize the slurry thus obtained using a wet pulverizer. However, it may be dry pulverized.

The granulating method may be a dry method or a wet method as long as the various kinds of raw materials which have been pulverized in the previous step are not separated but are dispersed in the granulated particles, and it may be an extrusion granulation method, a tumbling granulation method, a fluidized granulation method, a mixing granulation method, a spray drying granulation method, a pressure molding granulation method, or a flake granulation method using a roll or the like. However, in the case of wet granulation, it is required to thoroughly dry the granulated particles before calcination. As the drying method, the granulated particles may be dried by a known drying method such as a spray thermal drying method, a hot air drying method, a vacuum drying method, or a freeze-drying method, and among them, a spray thermal drying method is preferable. The spray thermal drying method is preferably conducted using a thermal spray dryer (spray dryer).

It is preferable to conduct the calcination so that the granulated particles are held in a calcining furnace and an air atmosphere, an atmosphere having an adjusted oxygen partial pressure, or a carbon dioxide gas atmosphere, or another atmosphere at a temperature of from 800 to 1000° C. (it means the temperature in the case of bringing the thermocouple into contact with the material being calcined in the calcining furnace) for from 0.5 to 300 hours. At this time, it is preferable to select the calcining condition such that the transition metal converts into a solid solution at the atomic level to form a single phase.

The kind of calcining furnace is not particularly limited. For example, it is possible to calcine the granulated particles using a rotary kiln, an electrostatic stationary furnace, and another calcining furnace.

It is preferable to conduct the heat treatment in the air atmosphere and an environment of from 500 to 800° C. and preferably 700° C. or higher or 800° C. or lower for from 0.5 to 300 hours so as to easily incorporate oxygen into the granulated particles.

After the calcination or the heat treatment has been conducted in this manner, the calcined particles are subjected to the crushing and the classification if necessary, whereby the present spinel powder can be obtained.

Incidentally, it is possible to obtain the present spinel powder by conducting a series of separation treatment that the present spinel powder obtained in this manner is introduced into water, stirred by a stirring means such as a stirrer, and then appropriately allowed to stand, the supernatant is removed, and the precipitate is recovered at least one time and preferably repeating it two or more times. Next, this separation treatment will be described.

(Separation Treatment)

In the above separation treatment, it is preferable that the water in which the spinel-type lithium manganese-containing composite oxide (powder) is introduced has a pH of from 5 to 9, a temperature of from 15 to 25° C., and a volume to be from 1.2 to 2 times to the spinel-type lithium manganese-containing composite oxide (powder).

It is also possible to use a liquid such as ethanol in addition to water.

The water tank to be filled with water preferably has a size of from 200 to 5000 mL.

As the stirring means, it is possible to use an arbitrary stirring bar such as a stirrer or a magnetic stirrer, and as the stirring speed, it is preferable to stir the powder to an extent to which the powder does not precipitate but flows and, as a guideline, for example, at a rotational speed of from 200 to 250 rpm.

As the standing time after stirring, it is preferable to set an appropriate time for the state that most of the powder is settled and fine powders are suspended, and as a guideline, for example, it is preferably from 1 to 5 minutes and particularly preferably 2 minutes or longer or 3 minutes or shorter among them.

It is preferable to sufficiently remove H (hydrogen) in the vicinity of the surface by heating the recovered spinel-type lithium manganese-containing composite oxide (powder) to 300° C. or higher.

(Method for Forming Layer A)

Next, the present spinel powder obtained as described above is subjected to the surface treatment using a mixture prepared by mixing a surface treatment agent such as a titanium coupling agent, an aluminum coupling agent, a zirconium coupling agent, a titanium-aluminum coupling agent or an aluminum-zirconium coupling agent with an organic solvent and dried, and the coupling agent is reacted with the lithium manganese-containing composite oxide particles (core particles) to form the layer A, whereby the present positive electrode active material can be obtained.

The titanium coupling agent or the aluminum coupling agent or the zirconium coupling agent or the titanium-aluminum coupling agent or the aluminum-zirconium coupling agent may be a compound having an organic functional group and a hydrolyzable group in the molecule, and is preferably those which have phosphorus (P) in the side chain among them. A coupling agent having phosphorus (P) in the side chain exhibits more favorable affinity for the binder and thus exhibits particularly excellent binding property with the binder.

In the case of conducting the surface treatment by mixing such a coupling agent with an organic solvent, it is required to dry the powder by heating, for example, to from 40 to 120° C. in order to volatilize the organic solvent. After drying, it is preferable to heat the powder at a temperature higher than the boiling point of the organic solvent and less than 300° C. in order to fix the layer A and to react (also simply referred to as the reaction) the lithium manganese-containing composite oxide particles (core particles) with the coupling agent.

The drying and the reaction at this time are preferably conducted in an oxygen-containing atmosphere. Most of the organic solvent or the side chain of the coupling agent is removed by heat supplied at the time of the drying and the reaction. At that time, there is a possibility that oxygen in the active material is also lost. In addition, there is a possibility that the hydrogens in a part of the organic solvent or side chain of the coupling agent, which is remained, are substituted with Li in the active material. It is believed to be able to prevent the above effect to the active material by conducting the drying and the reaction in an oxygen-containing atmosphere. From this point of view, it is preferable to conduct the drying and the reaction in an air atmosphere and an oxygen atmosphere among the oxygen-containing atmospheres.

Incidentally, the oxygen atmosphere indicates an atmosphere in which the abundance of oxygen is greater than in the air atmosphere.

<Application of Present Positive Electrode Active Material>

The present positive electrode active material can be effectively utilized as a positive electrode active material for various kinds of lithium batteries after being crushed and classified if necessary.

In the case of utilizing the present positive electrode active material as a positive electrode active material for various kinds of lithium batteries, for example, it is possible to produce a positive electrode mixture by mixing the present positive electrode active material with a conductive material composed of carbon black or the like and a binder composed of the Teflon (registered trademark) binder or the like. Thereafter, it is possible to constitute a lithium battery using such a positive electrode mixture as the positive electrode, a material, such as lithium or carbon, which can absorb and release lithium as the negative electrode, a solution prepared by dissolving a lithium salt such as lithium hexafluorophosphate ($LiPF_6$) in a mixed solvent such as ethylene carbonate and dimethyl carbonate as the non-aqueous electrolyte.

The lithium battery constituted in this manner can be used, for example, in an electronic device such as a notebook computer, a mobile phone, a cordless phone handset, a video movie, a liquid crystal television, an electric shaver, a portable radio, a headphone stereo, a backup power supply, or a memory card, a medical device such as a pacemaker or a hearing aid, a driving power source for being mounted in an electric vehicle. Among them, it is particularly effective as various kinds of portable computers requiring excellent cycle characteristics such as a mobile phone, a PDA (portable information terminal), and a notebook computer, a driving power source of an electric vehicle (including a hybrid car) or a power source for power storage.

<Description of Phrase>

In the present specification, in a case in which it is expressed as "X to Y" (X and Y are arbitrary numbers), it also includes the meaning of "preferably more than X" or "preferably less than Y" as well as the meaning of "X or more and Y or less" unless otherwise stated.

In addition, in a case in which it is expressed as "X or more" (X is an arbitrary number) or "Y or less" (Y is an arbitrary number), it is also include the intention to instruct "preferable to be more than X" or "preferable to be less than Y".

In addition, each of the numerical value ranges specified in the invention is intended to include the range that falls within a range of the upper limit value and the lower limit value when being rounded off unless otherwise stated. However, it is preferably within the range of the numerical value obtained by truncating the figure below the significant figure.

EXAMPLES

Next, the invention will be further described based on Examples and Comparative Examples. However, the invention is not limited to Examples to be described below. The condition for the surface treatment is presented in Table 1.

Comparative Example 1

Lithium carbonate, electrolytic manganese dioxide, nickel hydroxide, titanium oxide, and lithium tetraborate ($Li_2B_4O_7$) were weighed so as to be Li: 3.9% by mass, Mn: 40.1% by mass, Ni: 15.5% by mass, Ti: 5.3% by mass, and B: 0.14% by mass, mixed together by adding water, and stirred to prepare a slurry having a solid concentration of 10 wt %.

Ammonium polycarboxylate (SN-DISPERSANT 5468 manufactured by SAN NOPCO LIMITED) as the dispersant was added to the slurry (raw material powder: 500 g) thus obtained in an amount of being 6 wt % of solid content of the slurry, and the slurry was pulverized at 1300 rpm for 20 minutes using a wet pulverizer so as to have an average particle size (D50) of 0.5 μm or less.

The pulverized slurry thus obtained was granulated and dried using a thermal spray dryer (spray dryer "i-8" manufactured by OHKAWARA KAKOHKI CO., LTD.). At this time, a rotating disc was used for spraying, and the granulation and drying was conducted at a rotation number of 24000 rpm and a supply amount of the slurry of 12 kg/hr by adjusting the temperature such that the exit temperature of the drying tower was 100° C.

The granulated powder thus obtained was calcined at 950° C. for 70 hours in the air using a stationary electric furnace and then subjected to the heat treatment at 700° C. for 70 hours in the air. The calcined powder obtained by heat treatment was classified using a sieve having a mesh of 75 μm, and the undersize particles were recovered, thereby obtaining a spinel-type lithium manganese-containing composite oxide powder.

The spinel-type lithium manganese-containing composite oxide powder thus obtained was identified using an X-ray diffraction apparatus (XRD), and the result demonstrated that it was a 5 V-class spinel-type lithium manganese-containing composite oxide represented by Formula (1): $Li[Li_aMn_{2-a-c}M1_bM2_c]O_{4-\delta}$.

Into a plastic beaker with handles (volume: 2000 mL) which was filled with water having a pH of from 6 to 7, a temperature of 20° C., and a volume of 2000 mL, 1 kg of the spinel-type lithium manganese-containing composite oxide powder thus obtained was introduced and stirred at a rotation speed of from 200 to 250 rpm for 10 minutes using a stirrer (propeller area: 24 cm$^2$), stirring was then stopped, the stirrer was taken out from the water, and the resultant was allowed to stand for 2 minutes. Thereafter, the supernatant up to the height of 5/12 was removed through decantation, the residual was recovered as a precipitate using a suction filtration machine (filter paper: 131), the precipitate thus recovered was allowed to stand for 24 hours in an environment of 120° C. to dry it and then further allowed to stand for 24 hours in a state of being heated so as to have the product temperature of 500° C. to dry it.

Example 1

Using a cutter mill (MILLSER 720G manufactured by Iwatani Corporation), 100 parts by mass of the spinel-type lithium manganese-containing composite oxide powder obtained in the same manner as in Comparative Example 1, 0.5 part by mass of a titanium coupling agent (PLENACT (registered trademark) KR-46B manufactured by Ajinomoto Fine-Techno Co., Inc.) as the surface treatment agent, and 0.7 part by mass of isopropyl alcohol (boiling point: 82° C.) as the solvent were mixed together. Subsequently, the mixed spinel-type lithium manganese-containing composite oxide powder was placed in a dryer, then dried and reacted under the condition of 100° C. and 1 hour in the air, thereby obtaining a spinel-type lithium manganese-containing composite oxide powder (sample) with a surface-treated layer.

The cross section in the vicinity of the particle surface of the spinel-type lithium manganese-containing composite oxide powder (sample) fabricated in this manner was observed using a transmission electron microscope ("JEM-ARM200F" manufactured by JEOL Ltd.) and the result demonstrated that the layer A was partially present on the surface of the core portion composed of the spinel-type lithium manganese-containing composite oxide. In addition, the layer A was analyzed by EDS, and it was found to contain titanium (Ti), phosphorus (P), and carbon (C). The thickness of the layer A was different depending on the location, and the thin part was 0.1 nm and the thick part was 50 nm.

Example 2

A spinel-type lithium manganese-containing composite oxide powder (sample) with a surface-treated layer was obtained in the same manner as in Example 1 except that, the surface treatment agent, the amount of a titanium coupling agent (PLENACT (registered trademark) KR-46B manufactured by Ajinomoto Fine-Techno Co., Inc.) was changed to 1.0 part by mass and the amount of isopropyl alcohol as the solvent was changed to 1.4 parts by mass.

The cross section in the vicinity of the particle surface of the spinel-type lithium manganese-containing composite oxide powder (sample) fabricated in this manner was observed using a transmission electron microscope ("JEM-ARM200F" manufactured by JEOL Ltd.), and the result demonstrated that the layer A was partially present on the surface of the core portion composed of the spinel-type lithium manganese-containing composite oxide. In addition, the layer A was analyzed by EDS, and it was found to contain titanium (Ti), phosphorus (P), and carbon (C). The thickness of the layer A was different depending on the location, and the thin part was 0.1 nm and the thick part was 60 nm.

Example 3

A spinel-type lithium manganese-containing composite oxide powder (sample) with a surface-treated layer was obtained in the same manner as in Example 1 except that, as the surface treatment agent used in Example 1, the amount of a titanium coupling agent (PLENACT (registered trademark) KR-46B manufactured by Ajinomoto Fine-Techno Co., Inc.) was changed to 3.0 parts by mass and the amount of isopropyl alcohol as the solvent was changed to 4.2 parts by mass.

The cross section in the vicinity of the particle surface of the spinel-type lithium manganese-containing composite oxide powder (sample) fabricated in this manner was observed using a transmission electron microscope ("JEM-ARM200F" manufactured by JEOL Ltd.), and the result demonstrated that the layer A was partially present on the surface of the core portion composed of the spinel-type lithium manganese-containing composite oxide. In addition, the layer A was analyzed by EDS, and it was found to contain titanium (Ti), phosphorus (P), and carbon (C). The thickness of the layer A was different depending on the location, and the thin part was 0.1 nm and the thick part was 70 nm.

Comparative Example 2

A spinel-type lithium manganese-containing composite oxide powder (sample) was obtained in the same manner as in Comparative Example 1 except that lithium carbonate, electrolytic manganese dioxide, nickel hydroxide, titanium oxide, and lithium tetraborate (Li$_2$B$_4$O$_7$) were weighed so as to be Li: 3.9% by mass, Mn: 42.3% by mass, Ni: 14.3% by mass, Ti: 3.8% by mass, and B: 0.14% by mass and mixed together.

Example 4

In the same manner as in Comparative Example 2, 100 parts by mass of a spinel-type lithium manganese-containing composite oxide powder was obtained. Thereafter, a spinel-type lithium manganese-containing composite oxide powder (sample) with a surface-treated layer was obtained by conducting the surface treatment and the drying in the same manner as in Example 3 except that the surface treatment agent was changed to an aluminum coupling agent (PLENACT (registered trademark) AL-M manufactured by Ajinomoto Fine-Techno Co., Inc.) and the amount thereof was set to 3.0 parts by mass with respect to the spinel-type lithium manganese-containing composite oxide powder, and the reaction was conducted in the oxygen atmosphere (flow rate of oxygen: 0.5 mL/min) and the reaction temperature was set to 200° C.

The cross section in the vicinity of the particle surface of the spinel-type lithium manganese-containing composite oxide powder (sample) fabricated in this manner was observed using a transmission electron microscope ("JEM-ARM200F" manufactured by JEOL Ltd.), and the result demonstrated that the layer A was partially present on the surface of the core portion composed of the spinel-type lithium manganese-containing composite oxide. In addition, the layer A was analyzed by EDS, and it was found to contain aluminum (Al), phosphorus (P), and carbon (C). The thickness of the layer A was different depending on the location, and the thin part was 0.1 nm and the thick part was 40 nm.

Example 5

In the same manner as in Comparative Example 2, 100 parts by mass of a spinel-type lithium manganese-containing composite oxide powder was obtained. Thereafter, a spinel-type lithium manganese-containing composite oxide powder (sample) with a surface-treated layer was obtained by conducting the surface treatment, the drying, and the reaction in the same manner as in Example 4 except that the surface treatment agent was changed to 3.0 parts by mass of a zirconium coupling agent (Ken-React (registered trademark) NZ12 manufactured by Kenrich Petrochemicals, Inc.).

The cross section in the vicinity of the particle surface of the spinel-type lithium manganese-containing composite oxide powder (sample) fabricated in this manner was observed using a transmission electron microscope ("JEM-ARM200F" manufactured by JEOL Ltd.), and the result demonstrated that the layer A was partially present on the surface of the core portion composed of the spinel-type lithium manganese-containing composite oxide. In addition, the layer A was analyzed by EDS, and it was found to contain zirconium (Zr), phosphorus (P), and carbon (C). The thickness of the layer A was different depending on the location, and the thin part was 0.1 nm and the thick part was 70 nm.

<Method for Measuring Various Physical Property Values>

Various kinds of physical property values of the "spinel-type lithium manganese-containing composite oxide powders (samples)" obtained in Examples and Comparative Examples were measured as follows.

(Specific Surface Area)

The specific surface area (BET) of the "spinel-type lithium manganese-containing composite oxide powders (samples)" obtained in Examples and Comparative Examples was measured as follows.

First, 0.5 g of the sample (powder) was weighed and introduced into the glass cell for a flow system gas adsorption method specific surface area measuring apparatus MONOSORB LOOP ("product name: MS-18" manufactured by Yuasa Ionics Co., Ltd.), the inside of the glass cell was purged with a nitrogen gas at a gas flow rate of 30 mL/min using a pretreatment apparatus for the MONOSORB LOOP for 5 minutes, and then subjected to the heat treatment at 250° C. for 10 minutes in the nitrogen gas atmosphere. Thereafter, the sample (powder) was subjected to the measurement by BET equation one point method using the MONOSORB LOOP.

Incidentally, a mixed gas of 30% nitrogen: 70% helium was used as the adsorption gas at the time of the measurement.

(D10, D50, and Dmin)

For the "spinel-type lithium manganese-containing composite oxide powders (samples)" obtained in Examples and Comparative Examples, the sample (powder) was introduced into a water-soluble solvent and irradiated with ultrasonic waves of 40 W at a flow rate of 40% for 360 seconds using an automatic sample supply machine for laser diffraction particle size distribution measuring apparatus ("Microtorac SDC" manufactured by NIKKISO CO., LTD.), the particle size distribution was then measured using a laser diffraction particle size distribution measuring apparatus "MT3000II" manufactured by NIKKISO CO., LTD., and D10, D50, and Dmin were determined from the chart of volume-based particle size distribution thus obtained, respectively.

Incidentally, the water-soluble solvent used in the measurement was filtered through a filter of 60 μm, the measurement was conducted two times by setting the solvent refractive index to 1.33, the particle penetration condition to penetration, the particle refractive index to 2.46, the shape to a non-spherical shape, the measurement range to from 0.133 to 704.0 w, and the measurement time to 30 seconds, and an average value thereof was adopted as D10, D50, Dmin, respectively.

(Measurement of Content of Carbon)

For the "spinel-type lithium manganese-containing composite oxide powders (samples)" of the sample for measurement, the measurement of the content of carbon ("C content" in Table) was conducted. The analyzer and the measurement condition are as follows.

Analyzer: analyzer for carbon in solid (EMIA-110 manufactured by HORIBA, Ltd.)

Carrier gas: oxygen (purity: 99.95% or more), gas pressure: 0.75±0.05 kgf/cm$^2$ and Measurement condition: standard setting condition described in manual for EMIA-110 (combustion set time was changed to 60 seconds)

(Measurement of components)

The content of lithium, the content of manganese, the content of aluminum, the content of nickel, the content of titanium, and the content of zirconium in the spinel-type lithium manganese-containing composite oxide (powders) obtained in Examples 2, 4, 5 and Comparative Examples 1 and 2 were measured by inductive coupling plasma (ICP) emission spectroscopic analysis, and the results are presented in Table 4.

<Evaluation of Battery>

Using the "spinel-type lithium manganese-containing composite oxide powders (samples)" fabricated in Examples and Comparative Examples as the positive electrode active material, 2032-type coin cell batteries were fabricated, and the cell performance evaluation test to be described below was conducted using these.

(Fabrication of 2032-Type Coin Cell Battery)

A mixture of 89 wt % of the "spinel-type lithium manganese-containing composite oxide powders (samples)" fabricated in Examples and Comparative Examples, 5 wt % of acetylene black as the conductive auxiliary agent, and 6 wt % of PVDF as the binder was adjusted into a paste form by adding NMP (N-methylpyrrolidone). This paste was coated on an Al foil current collector having a thickness of 15 μm and dried at 120° C. Thereafter, the coated Al foil current collector was pressed so as to have a thickness of 80 μm, thereby fabricating the positive electrode sheet.

A copper foil having a thickness of 18 μm was used as the negative electrode current collector. The mixture of 92 wt % of graphite as the active material and 8 wt % of PVDF as the binder material was prepared in a paste form by adding NMP. This paste was uniformly coated on the negative electrode current collector and dried at 100° C. Thereafter, the coated negative electrode current collector was pressed so as to have a thickness of 80 μm, thereby fabricating the negative electrode sheet.

(Output Characteristic Evaluation Test)

The positive electrode sheet thus obtained was cut into a size of ϕ13 to use as the positive electrode, meanwhile, the lithium metal was cut into a size of ϕ15 to use as the negative electrode, and a separator (porous polyethylene film) that was impregnated with an electrolytic solution prepared by dissolving $LiPF_6$ in a mixed solvent of ethylene carbonate, ethyl methyl carbonate, and dimethyl carbonate (volume ratio=20:20:60) so as to be 1 mol/L and further adding vinylene carbonate as the additive at 2% by volume was sandwiched between the positive electrode and the negative electrode, thereby fabricating a 2032-type coin cell battery.

These 2032-type coin cell batteries were charged up to 5.0 V and then discharged to 3.0 V at normal temperature, and this was repeated three cycles to conduct initial activation. Thereafter, the output characteristic test was conducted in a state that the batteries were charged up to the capacity reaching 60% of the discharge capacity of the third cycle at 1 C.

For the output characteristic test, a current was allowed to flow for 10 seconds so as to have 3 C using the HZ-3000 (AUTOMATIC POLARIZATION SYSTEM manufactured by HOKUTO DENKO CORP.), a difference (voltage change ΔV) between the voltage of the battery before a current was allowed to flow and the voltage at the time point of 10th second was measured to use as the indicator of the output characteristics. The relative value (%) with respect to 100.0% of the voltage change ΔV in Comparative Example 1 is presented in Table 2, and the relative value (%) with respect to 100.0% of the voltage change ΔV in Comparative Example 2 is presented in Table 3.

TABLE 2

| | Result of particle size distribution measurement | | | C content | BET | Voltage change index ΔV at 10th second (Comparative Example 1 = 100%) |
| | D50 μm | D10 μm | Dmin μm | % by mass | $m^2/g$ | % |
| --- | --- | --- | --- | --- | --- | --- |
| Example 1 | 24.5 | 15.3 | 6.0 | 0.20 | 0.18 | 62.1 |
| Example 2 | 26.1 | 14.3 | 6.0 | 0.32 | 0.20 | 72.4 |
| Example 3 | 26.5 | 14.6 | 6.0 | 0.38 | 0.32 | 82.8 |
| Comparative Example 1 | 25.7 | 13.3 | 5.0 | 0.004 | 0.15 | 100.0 |

TABLE 3

| | Result of particle size distribution measurement | | | C content | BET | Voltage change index ΔV at 10th second (Comparative Example 2 = 100%) |
| | D50 μm | D10 μm | Dmin μm | % by mass | $m^2/g$ | % |
| --- | --- | --- | --- | --- | --- | --- |
| Example 4 | 16.4 | 7.5 | 2.5 | 0.26 | 0.86 | 75.7 |
| Example 5 | 17.0 | 7.5 | 2.5 | 0.11 | 0.43 | 69.9 |
| Comparative Example 2 | 16.2 | 6.2 | 1.5 | 0.004 | 0.25 | 100.0 |

TABLE 4

| | Analysis value (wt. %) | | | | | |
| | Li | Mn | Ni | Ti | Al | Zr |
| --- | --- | --- | --- | --- | --- | --- |
| Example 2 | 3.97 | 39.3 | 15.5 | 5.10 | <0.01 | <0.01 |
| Example 4 | 3.89 | 41.0 | 14.4 | 3.67 | 0.14 | <0.01 |
| Example 5 | 3.91 | 40.6 | 14.3 | 3.63 | <0.01 | 0.027 |
| Comparative Example 1 | 4.10 | 39.6 | 15.9 | 4.98 | <0.01 | <0.01 |
| Comparative Example 2 | 3.94 | 40.7 | 14.2 | 3.67 | <0.01 | <0.01 |

DISCUSSION

From the results above, it has been found that according to a lithium manganese-containing composite oxide powder in which the entire surface or a part of the core particle

TABLE 1

| | Condition for surface treatment | | | | | | |
| | Coupling agent | | Solvent | | Drying | | Reaction | |
| | Kind | Amount added (parts by mass) | Kind | Amount added (parts by mass) | Atmosphere | Temperature (° C.) | Atmosphere | Temperature (° C.) |
| --- | --- | --- | --- | --- | --- | --- | --- | --- |
| Example 1 | Ti | 0.5 | Isopropyl alcohol | 0.7 | In air atmosphere | 100 | In air atmosphere | 100 |
| Example 2 | Ti | 1.0 | | 1.4 | | | | |
| Example 3 | Ti | 3.0 | | 4.2 | | | | |
| Example 4 | Al | 3.0 | | | | | *In oxygen atmosphere | 200 |
| Example 5 | Zr | 3.0 | | | | | | |

*The reaction was conducted by setting the flow rate of oxygen to 0.5 mL/min in order to obtain the oxygen atmosphere.

surface is equipped with the layer A containing titanium (Ti) and carbon (C) as described above, it is possible to improve the output characteristics.

The presence of the layer A has been confirmed even using an X-ray photoelectron spectroscopic (XPS) analyzer. Furthermore, it was possible to confirm a change in composition derived from the coupling agent component when Example 2 and Comparative Example 1, and Examples 4 and 5 and Comparative Example 2 are compared to each other in Table 4. It indicates that the layer A is formed on the entire surface or a part of the core particle surface together with the results of analysis by EDS.

In addition, the effect as described above was obtained by forming the layer A containing titanium (Ti) and carbon (C) in this manner. In addition, the same effect as the above was obtained by forming the layer A containing aluminum (Al) or zirconium (Zr) which is similar to titanium (Ti) in property and carbon (C). It is believed to exert the same effect since these have a common property to have a relatively low density.

The invention claimed is:

1. A positive electrode active material for a lithium secondary battery comprising positive electrode active material particles, wherein the positive electrode active material particles have a layer (referred to as the "layer A") on a part of a surface of lithium manganese-containing composite oxide particles (also referred to as the "core particles") operating at a charging voltage in a region exceeding 4.3 V in a metal Li reference potential,
wherein the layer A comprises at least:
a) titanium (Ti), aluminum (Al), zirconium (Zr), titanium (Ti) and aluminum (Al), or aluminum (Al) and zirconium (Zr),
b) an organic functional group, and
c) phosphorus, and
wherein the layer A does not comprise fluorine (F).

2. A positive electrode active material for a lithium secondary battery comprising positive electrode active material particles, wherein the positive electrode active material particles have a layer (referred to as the "layer A") on a part of a surface of lithium manganese-containing composite oxide particles (also referred to as the "core particles") operating at a charging voltage in a region exceeding 4.3 V in a metal Li reference potential,
wherein the layer A is a layer formed by using a coupling agent containing no fluorine (F) but containing at least: carbon (C), and titanium (Ti), aluminum (Al), zirconium (Zr), titanium (Ti) and aluminum (Al), or aluminum (Al) and zirconium (Zr), and wherein the layer A comprises phosphorus.

3. The positive electrode active material for a lithium secondary battery according to claim 1, wherein a content of carbon is from 0.1 to 0.5% by mass.

4. The positive electrode active material for a lithium secondary battery according to claim 1, wherein a thickness of the layer A is from 0.1 to 200 nm.

5. The positive electrode active material for a lithium secondary battery according to claim 1, wherein the positive electrode active material has a specific surface area of from 0.01 to 3.00 m$^2$/g.

6. The positive electrode active material for a lithium secondary battery according to claim 1, wherein D50 according to a volume-based particle size distribution obtained by measuring by a laser diffraction and scattering particle size distribution measuring method is from 5 to 40 µm.

7. The positive electrode active material for a lithium secondary battery according to claim 1, wherein D10 according to a volume-based particle size distribution obtained by measuring by a laser diffraction and scattering particle size distribution measuring method is from 2 to 20 µm.

8. The positive electrode active material for a lithium secondary battery according to claim 1, wherein Dmin according to a volume-based particle size distribution obtained by measuring by a laser diffraction and scattering particle size distribution measuring method is 10 µm or less.

9. The positive electrode active material for a lithium secondary battery according to claim 1, wherein the lithium manganese-containing composite oxide particles are spinel-type lithium manganese-containing composite oxide particles having an operating potential of 4.5 V or more at a metal Li reference potential.

10. The positive electrode active material for a lithium secondary battery according to claim 1, wherein the lithium manganese-containing composite oxide particles are spinel-type lithium manganese-containing composite oxide particles including a crystal phase obtained by substituting a part of Mn sites in $LiMn_2O_{4-\delta}$ with Li, a metal element M1, and another metal element M2.

11. A lithium secondary battery comprising the positive electrode active material for a lithium secondary battery according to claim 1.

12. The lithium secondary battery comprising the positive electrode active material for a lithium secondary battery according to claim 2.

13. The positive electrode active material for a lithium secondary battery according to claim 2, wherein a content of carbon is from 0.1 to 0.5% by mass.

14. The positive electrode active material for a lithium secondary battery according to claim 2, wherein the lithium manganese-containing composite oxide particles are spinel-type lithium manganese-containing composite oxide particles having an operating potential of 4.5 V or more at a metal Li reference potential.

15. The positive electrode active material for a lithium secondary battery according to claim 3, wherein the lithium manganese-containing composite oxide particles are spinel-type lithium manganese-containing composite oxide particles having an operating potential of 4.5 V or more at a metal Li reference potential.

16. The positive electrode active material for a lithium secondary battery according to claim 2, wherein the lithium manganese-containing composite oxide particles are spinel-type lithium manganese-containing composite oxide particles including a crystal phase obtained by substituting a part of Mn sites in $LiMn_2O_{4-\delta}$ with Li, a metal element M1, and another metal element M2.

* * * * *